(12) United States Patent
Sarrigeorgidis (10) Patent No.: US 9,001,873 B2
(45) Date of Patent: Apr. 7, 2015

(54) METHOD AND APPARATUS FOR RECURSIVELY COMPUTING EQUALIZER PARAMETERS FOR MULTIPLE-INPUT MULTIPLE-OUTPUT (MIMO) WIRELESS COMMUNICATION CHANNELS

(71) Applicant: Marvell World Trade Ltd., St. Michael (BB)

(72) Inventor: Konstantinos Sarrigeorgidis, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/252,860

(22) Filed: Apr. 15, 2014

(65) Prior Publication Data

US 2014/0226703 A1  Aug. 14, 2014

Related U.S. Application Data

(63) Continuation of application No. 13/725,167, filed on Dec. 21, 2012, now Pat. No. 8,699,556, which is a continuation of application No. 12/902,394, filed on Oct. 12, 2010, now Pat. No. 8,340,169, which is a (Continued)

(51) Int. Cl.
*H04B 7/06* (2006.01)
*H04L 25/02* (2006.01)

(Continued)

(52) U.S. Cl.
CPC .......... *H04B 7/0684* (2013.01); *H04L 25/0224* (2013.01); *H04L 25/0246* (2013.01); *H04L 2025/03426* (2013.01); *H04B 7/0413* (2013.01)

(58) Field of Classification Search
CPC ...................................................... H04L 25/02
USPC .................................. 375/219, 229, 230, 231
See application file for complete search history.

(56) References Cited

U.S. PATENT DOCUMENTS 6,829,312 B1  12/2004  Laurila et al.
7,050,513 B1   5/2006  Yakhnich (Continued)

FOREIGN PATENT DOCUMENTS

EP   1 566 917 A2   8/2005
WO  WO-2006/004706 A1   1/2006

OTHER PUBLICATIONS

Summary of Notice of Reasons for Rejection dated May 15, 2012 for Application No. 2008-;550466; 1 page.

(Continued)

*Primary Examiner* — Jaison Joseph (57) ABSTRACT

A wireless receiver includes an input module, a channel module, an equalizer module, and a decoder module. The input module receives a message over a wireless communication channel. The message includes a plurality of training fields and first data. The first data includes user data perturbed by the channel. The channel module generates a first matrix indicative of an estimation of properties of the channel. The channel module, as each of the plurality of training fields of the message is being received, recursively computes parameters for equalization based on the plurality of training fields, the first matrix, and a vector indicative of a substream signal-to-noise ratio. The equalizer module generates equalizer coefficients based on the parameters for equalization and applies the equalizer coefficients to the first data of the message to generate compensated first data. The decoder module decodes the compensated first data to recover the user data.

21 Claims, 7 Drawing Sheets

Related U.S. Application Data continuation of application No. 11/521,182, filed on Sep. 14, 2006, now Pat. No. 7,813,421.

(60) Provisional application No. 60/759,453, filed on Jan. 17, 2006.

(51) Int. Cl.
  *H04B 7/04* (2006.01)
  *H04L 25/03* (2006.01)

(56) References Cited

U.S. PATENT DOCUMENTS

| | | | |
|---|---|---|---|
| 7,239,672 | B2 | 7/2007 | Su |
| 7,346,129 | B2 | 3/2008 | Gaikwad |
| 7,978,759 | B1 * | 7/2011 | Sarrigeorgidis ............... 375/232 |
| 2002/0027985 | A1 | 3/2002 | Rashid-Farrokhi |
| 2004/0081074 | A1 | 4/2004 | Piechocki |
| 2004/0091057 | A1 | 5/2004 | Yoshida |
| 2005/0141657 | A1 | 6/2005 | Maltsev et al. |
| 2005/0185738 | A1 | 8/2005 | Gaikwad |
| 2005/0201454 | A1 | 9/2005 | Chaudhuri et al. |
| 2005/0249303 | A1 | 11/2005 | Takano |
| 2006/0105767 | A1 | 5/2006 | Kim |
| 2006/0182206 | A1 | 8/2006 | Coon et al. |
| 2007/0127608 | A1 | 6/2007 | Scheim et al. |
| 2008/0112504 | A1 | 5/2008 | Jiang et al. |

OTHER PUBLICATIONS

The International Preliminary Report on Patentability and Written Opinion of the International Searching Authority for corresponding International Application No. PCT/US2007/001233.

Lo Tiing Tie et al., "Decoupled Maximum Likelihood Multiuser Channel Estimation for Asynchronous DS-CDMA System," IEEE International Symposium on Spread Spectrum Techniques and Applications, Aug. 30, 2004, pp. 92-96, IEEE: Piscataway, NJ, ISBN: 0-;7803-8408-3.

The Office Action dispatched Oct. 9, 2011, in corresponding Chinese; Application No. 200780002519.1.

802.11 n; IEEE P802.11-0410889r6; Wireless LANs, TGn Sync Proposal Technical; Specification; 131 pages. May 2005.

* cited by examiner

METHOD AND APPARATUS FOR RECURSIVELY COMPUTING EQUALIZER PARAMETERS FOR MULTIPLE-INPUT MULTIPLE-OUTPUT (MIMO) WIRELESS COMMUNICATION CHANNELS

CROSS-REFERENCE TO RELATED APPLICATIONS

The present disclosure is a continuation of U.S. patent application Ser. No. 13/725,167 (now U.S. Pat. No. 8,699,556), filed Dec. 21, 2012, which is a continuation of U.S. patent application Ser. No. 12/902,394 (now U.S. Pat. No. 8,340,169), filed on Oct. 12, 2010, which is a continuation of U.S. patent application Ser. No. 11/521,182 (now U.S. Pat. No. 7,813,421), filed on Sep. 14, 2006, which claims the benefit of U.S. Provisional Application No. 60/759,453, filed on Jan. 17, 2006. The entire disclosures of the above referenced applications are incorporated herein by reference.

FIELD

The present disclosure relates to channel estimation in a wireless communication system.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Some multiple input, multiple output (MIMO) wireless communication systems can estimate channel conditions, or gains, in the communication path between the transmitting and receiving antennas. The channel estimation process can include transmitting known training symbols, receiving the known training symbols, and processing the received symbols to estimate the channel conditions. The estimation is based on differences between the known training symbols and the received symbols. Information regarding the channel conditions can then be used to program coefficients of an equalizer of the receiver. The equalizer then compensates for the channel conditions.

Figure 1:
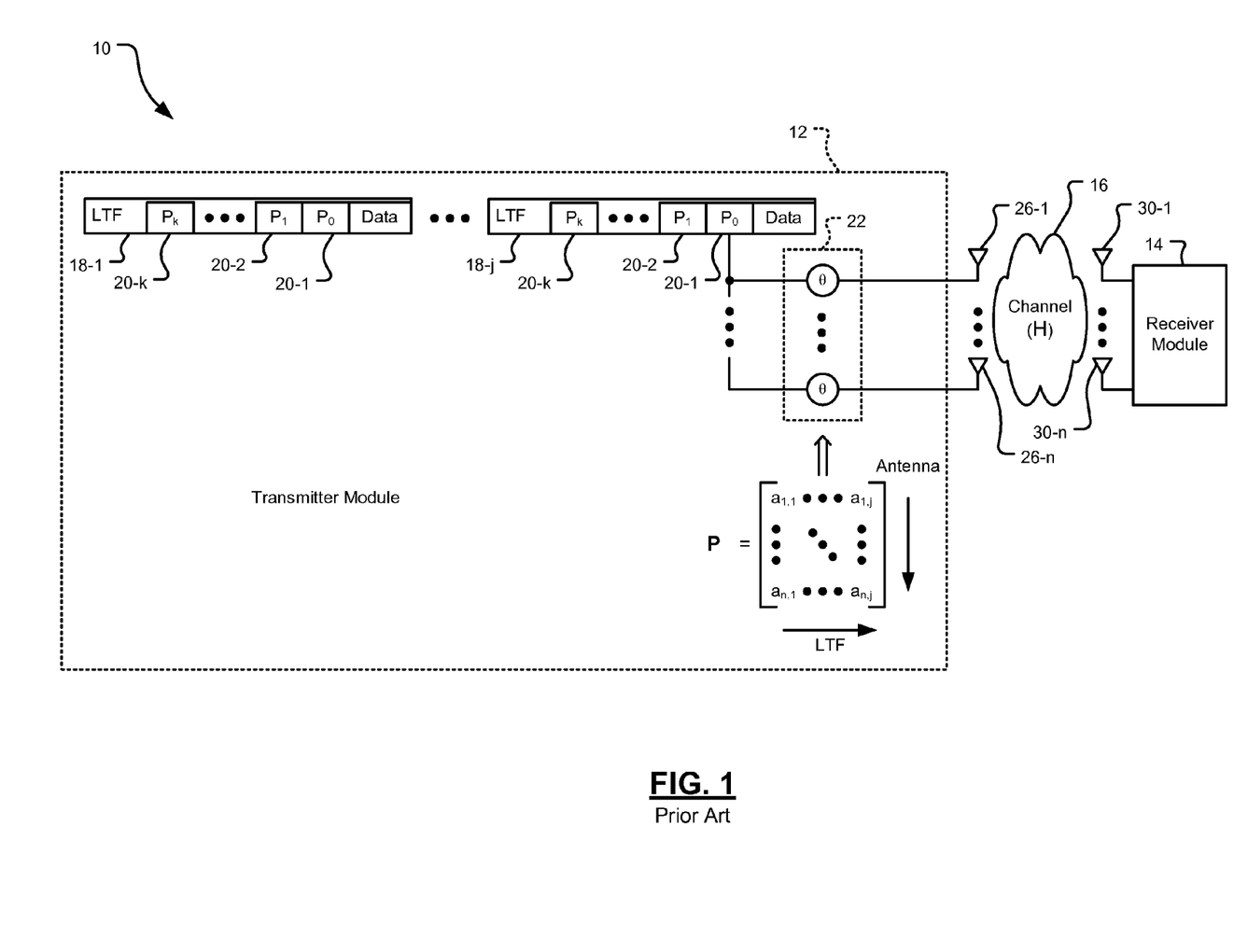
FIG. 1 is a functional block diagram of a multiple input, multiple output (MIMO) communication system according to the prior art.

Referring now to FIG. 1, an example is shown of a MIMO communication system 10 that complies with the Institute of Electrical and Electronics Engineers (IEEE) 802.11n specification, which is hereby incorporated by reference in its entirety. A transmitter module 12 communicates with a receiver module 14 via a wireless communication channel 16. A matrix H represents signal gains through channel 16.

Transmitter module 12 periodically generates a plurality of long training fields (LTFs) 18-1, . . . , 18-$j$, referred to collectively as LTFs 18. Each LTF 18 includes a plurality of training symbols 20-1, . . . , 20-$k$, referred to collectively as training symbols 20. A multiplier module 22 multiplies each training symbol 20 by a corresponding column of a preamble steering matrix P. A number of rows n of matrix P corresponds with a number of transmit antennas 26-1, . . . , 26-$n$, collectively referred to as antennas 26. The number of columns $j$ of matrix P corresponds with the number of LTFs 18. Matrix P assures the orthogonality of training symbols 20 as they are transmitted from antennas 26. Matrix P has a condition number of 1, i.e. cond(P)=1.

Receiver module 14 includes receiver antennas 30-1, . . . , 30-$n$, collectively referred to as antennas 30, that receive the training symbols via channel 16. After receiving all of the training symbols, receiver module 14 generates matrix H based on known training symbols 20, matrix P, and the received training symbols. Receiver module 14 can then use matrix H to adjust coefficients of an internal equalization module for signals from antennas 30. It is generally desirable for receiver module 14 to generate matrix H as quickly as possible.

A sample estimation of matrix H will now be described. Assume that n=3 and j=4. Transmitter module 12 then sends 4 LTFs 18 and matrix P is a 3×4 matrix $$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

The effective MIMO channel estimated at receiver module 14 is given by $H_{est}=HP \Rightarrow H=H_{est}P^{-1}$, where $H_{est}$ represents an estimation of matrix H. For the data associated with each LTF 18 the transmitter-to-receiver communication model can be described by $y=H_{est}P^{-1}x+n$, where x represents transmitted data symbols. The ZF solution is applied to the matrix $H_{est}P^{-1}$.

If the matrix P were not used, $y=Hx+n \Rightarrow \hat{x}=R^{-1}Q^*y$, where y represents received data symbols. With matrix P, $y=H_{est}P^{-1}x+n$. Receiver module 14 uses each LTF 18 to estimate a column of matrix $H_{est}$. Matrix H can therefore be estimated by waiting until all columns have been estimated and then estimating the matrix $H_{est}P^{-1}$. Receiver module 14 can then perform orthogonal-triangular decomposition (QR) on $H_{est}P^{-1}$, i.e $QR(H_{est}P^{-1})$. However, the computational density increases to the order of $n^3$, i.e. $O(n^3)$. To meet the processing latency the hardware burden would also increase based on $O(n^3)$.

The effect of matrix P will now be described to shed light on the above equations. Let $H_{est}=QR$. Without matrix P the equalized vector is given by $$\hat{x} = \frac{1}{\text{diag}(R^{-1}R^{-*})} R^{-1}Q^*y,$$

where $$W_{\|} = \frac{1}{\text{diag}(R^{-1}R^{-*})}.$$

With matrix P the equalized vector is given by:

$$\hat{x} = \frac{1}{\text{diag}((RP^{-1})^{-1}(RP^{-1})^{-*})} PR^{-1}Q^*y,$$

where $$W_{\|} = \frac{1}{\text{diag}((RP^{-1})^{-1}(RP^{-1})^{-*})}.$$

The equivalent matrix $RP^{-1}$ is a full matrix and it is difficult to compute its inverse for an n×n communication system.

SUMMARY

A receiver module includes an input that receives a data message from a wireless communication channel. The data message has a plurality of training fields and data. A channel estimator module recursively estimates a matrix H that represents the channel based on the plurality of training fields. The recursive estimation is performed as the plurality of training fields are being received. An equalizer module applies coefficients to the data based on the matrix H.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
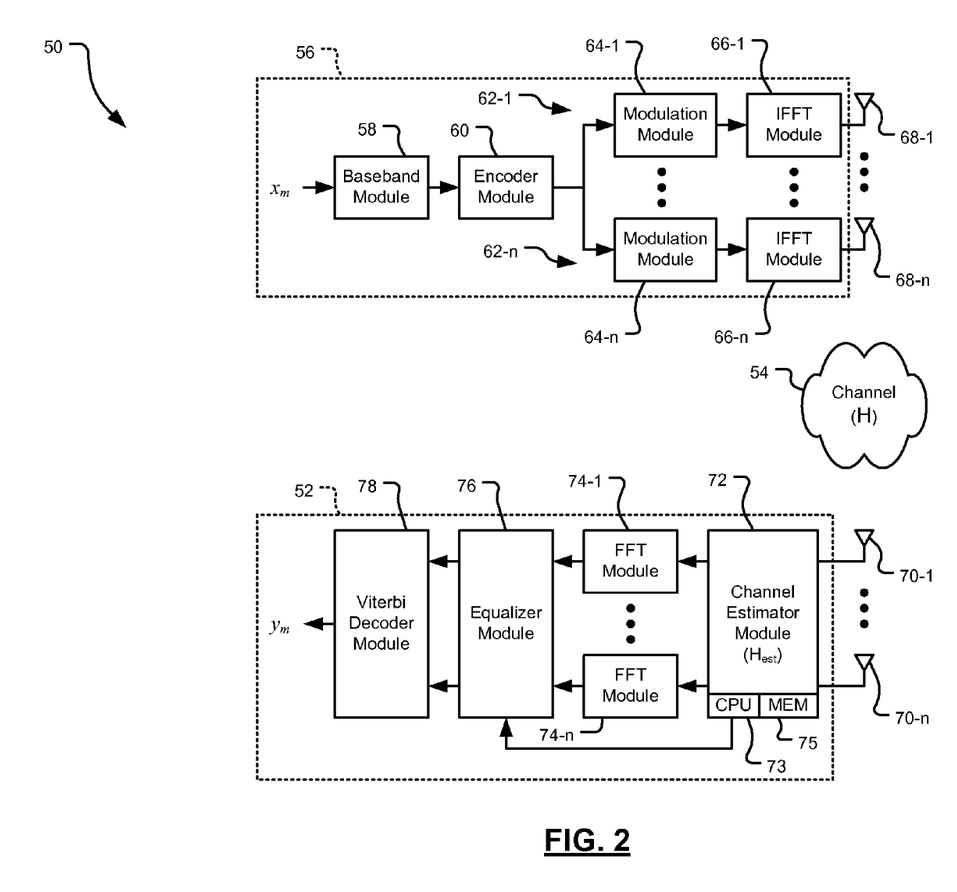
FIG. 2 is a functional block diagram of a MIMO communication system that includes a receiver that employs a recursive channel estimation method.

Referring now to FIG. 2, a functional block diagram is shown of a MIMO communication system 50. Communication system 50 includes a receiver module 52 that employs a recursive channel estimation method (shown in FIG. 5). The recursive channel estimation method estimates conditions in a wireless communication channel 54. The recursive estimation method begins with a first long training sequence that is sent by a transmitter module 56. The recursive estimation method ends by generating a channel estimation matrix H when the last long training sequence has been received. Since the recursive estimation method develops a basis for generating matrix H while the long training sequences are being received, instead of starting after the long training sequences have been received, the recursive estimation method can generate matrix H faster than previously known methods. The matrix H can then be used to perform channel equalization in receiver module 52 to compensate for the effects of communication channel 54.

Communication system 50 will now be described in pertinent part. A baseband module 58 generates data messages based on m streams of incoming data. Baseband module 58 communicates the data messages (shown in FIG. 4) to an encoder module 60. The data messages include respective long training fields that are compliant with IEEE 802.11n. Encoder module 60 encodes the long training fields into n data streams based on the matrix P, which is shown in FIG. 1. Encoder module 60 communicates the n data streams to n respective transmit channels 62-1, . . . , 62-n, which are referred to collectively as transmit channels 62. Each transmit channel 62 includes a respective modulation module 64 that modulates its respective data stream, such as with quadrature-amplitude modulation (QAM), and communicates the modulated data stream to a respective inverse fast-Fourier transform (IFFT) module 66. IFFT modules 66 convert their respective data streams from a frequency domain signal to a time domain signal. IFFT modules 66 communicate the time domain signals to respective radio frequency (RF) transmitters that are represented by antennas 68.

The transmitted data streams propagate through communication channel 54. Communication channel 54 perturbs the transmitted data streams due to phenomena such as reflections, signal attenuation, and so forth. The perturbations can be represented by matrix H.

Receiver module 52 includes n RF receivers that are represented by antennas 70-1, . . . , 70-n. The RF receivers receive the transmitted data streams and communicate the perturbed time domain signals to a channel estimator module 72. Channel estimator module 72 estimates matrix H based on matrix P and the long training fields that are included in the received data streams. In some embodiments channel estimator module 72 includes a processor 73 and associated memory 75 for storing and/or executing the recursive channel estimation methods that are described below.

Channel estimator module 72 communicates the n received data streams to n respective fast-Fourier transform (FFT) modules 74 and adjusts gains of an equalizer module 76. FFT modules 74 convert the time-domain data streams to frequency-domain data streams and communicate them to equalizer module 76. Equalizer module 76 compensates the respective data streams based on the gains and communicates the compensated gains to a Viterbi decoder module 78. Viterbi decoder module 78 decodes the n data streams to generate received data streams $y_m$.

Figure 3:
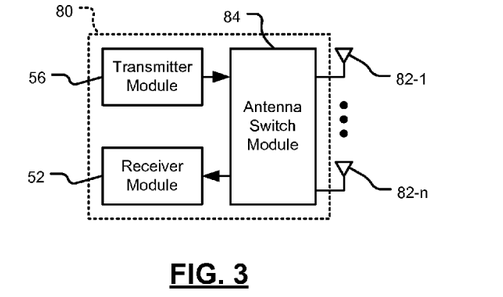
FIG. 3 is a functional block diagram of a MIMO transceiver that includes the receiver of FIG. 2.

Referring now to FIG. 3, a functional block diagram is shown of a transceiver 80 that includes transmitter module 56 and receiver module 52. Transceiver 80 can communicate with other transceivers 80 via antennas 82-1, . . . , 82-n. An antennas switch module 84 selectively connects antennas 82 to transmitter module 56 or receiver module 52 based on whether transceiver 80 is transmitting or receiving.

Figure 4:
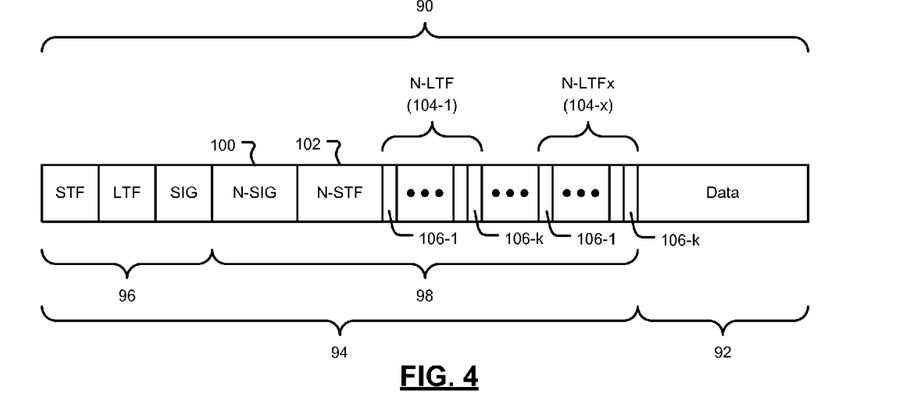
FIG. 4 is a data diagram of a prior art data message that is transmitted by a transmitter module of the communication system of FIG. 2.

Referring now to FIG. 4, a data diagram is shown of an IEEE 802.11n data message 90. Data message 90 includes data 92 and a preamble 94 that contains a plurality of training fields. Preamble 94 is divided into a first portion 96 and a second portion 98. First portion 96 may be used by legacy systems, e.g. non-MIMO, IEEE 802.11 communication systems. Second portion 98 includes a signal field 100, a short training field 102, and x long training fields (LTFs) 104-1, ..., 104-x, where x is an integer. Each LTF 104 includes k training symbols 106 or tones. Short training field 102 is generally used by receiver module 52 to establish symbol timing of data message 90. Channel estimator module 72 uses LTFs 104 and their k respective training symbols 106 to estimate matrix H based on methods that are described below.

Figure 5:
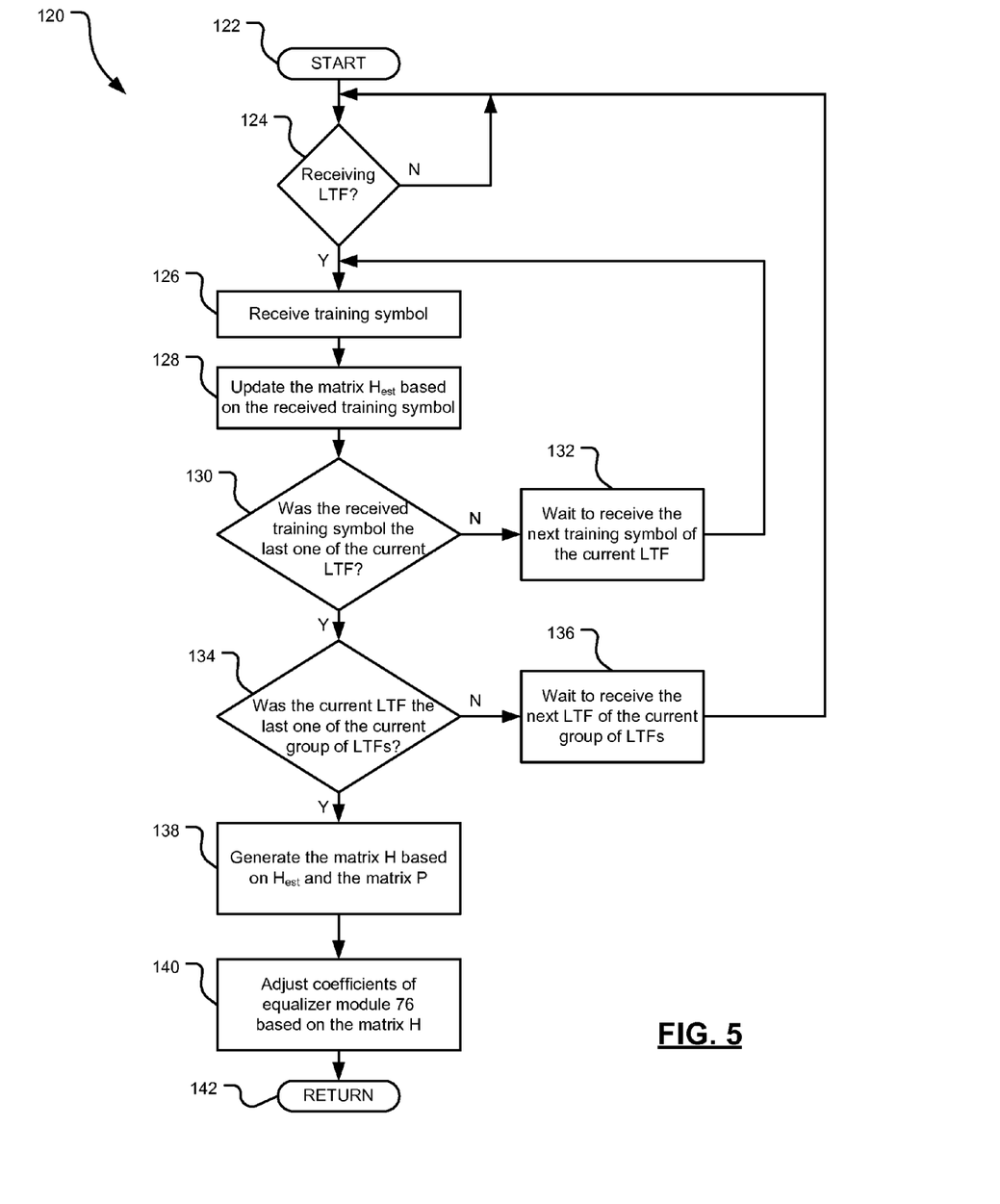
FIG. 5 is a flowchart of the recursive channel estimation method.

Referring now to FIG. 5, a method 120 is shown for estimating matrix H. Method 120 can be executed by channel estimator module 72. In some embodiments method 120 can be implemented as a computer program or firmware that is stored in memory 75 and executed by processor 73.

Control enters at a block 122 and proceeds to decision block 124. In decision block 124 control determines whether an LTF 104 is being received. If not then control returns to block 122. If an LTF 104 is being received then control branches from decision block 124 to block 126. In block 126 control receives a training symbol 106 that is associated with the current LTF 104. Control then proceeds to block 128 and updates a matrix $H_{est}$, which is described below in more detail, based on the current training symbol 106. Control then proceeds to decision block 130 and determines whether the current training symbol 106 was the last training symbol 106 of the present LTF 104. If not then control branches to block 132 and waits for the next training symbol 106 of the current LTF 104. When the next training symbol 106 is received control returns to block 126 and repeats the aforementioned steps for the new training symbol 106. On the other hand, if the training symbol 106 in decision block 130 was the last training symbol 106 of the present LTF 104 then control branches to decision block 134.

In decision block 134 control determines whether the current LTF 104 was the last LTF 104 (i.e. LTF 104-x) of the current group of LTFs 104. If not then control branches to block 136 and waits for the next LTF 104 to begin before returning to block 126. On the other hand, if the current LTF 104 was the last LTF 104-x then control branches from decision block 134 to block 138. In block 138 control generates matrix H based on matrix $H_{est}$ and matrix P. Control then proceeds to block 140 and adjusts the gains of equalizer module 76 based on matrix H. Control then returns to other processes via termination block 142.

As channel estimator module 72 executes method 120 it performs distributed QR across LTFs 104. That is, $QR(H_{est})$. Computational density therefore increases as $O(n^2)$ and the processing latency of associated hardware and/or processor 73 would increase by about $O(n^2)$. This represents an improvement, e.g. reduced need for processing power, over the prior art. Example estimations of matrix $H_{est}$ will now be provided for various MIMO dimensions of communications system 50.

2×2 and 2×3 MIMO Cases

In 2×2 and 2×3 MIMO cases the equalized vector is given by $$\hat{x} = \frac{1}{\text{diag}(P_{2\times 2} R_{2\times 2}^{-1} R_{2\times 2}^{-*} P_{2\times 2}^T)} P_{2\times 2} R_{2\times 2}^{-1} Q^* y$$

It can be seen that $$\hat{x} = \begin{bmatrix} \frac{r_{11}^2 r_{22}^2}{r_{22}^2 + \|r_{11} + r_{12}\|^2} & 0 \\ 0 & \frac{r_{11}^2 r_{22}^2}{r_{22}^2 + \|r_{11} - r_{12}\|^2} \end{bmatrix} \begin{bmatrix} 1 & -1 \\ 1 & 1 \end{bmatrix} \begin{bmatrix} \frac{1}{r_{11}} & -\frac{r_{12}}{r_{11} r_{12}} \\ 0 & \frac{1}{r_{22}} \end{bmatrix} Q^* y,$$

where $$W_{\|} = \begin{bmatrix} \frac{r_{11}^2 r_{22}^2}{r_{22}^2 + \|r_{11} + r_{12}\|^2} & 0 \\ 0 & \frac{r_{11}^2 r_{22}^2}{r_{22}^2 + \|r_{11} - r_{12}\|^2} \end{bmatrix},$$

$$P_{2\times 2} = \begin{bmatrix} 1 & -1 \\ 1 & 1 \end{bmatrix},$$

and $$R_{2\times 2}^{-1} = \begin{bmatrix} \frac{1}{r_{11}} & -\frac{r_{12}}{r_{11} r_{12}} \\ 0 & \frac{1}{r_{22}} \end{bmatrix}.$$

4×4 Spatial-Multiplexing (SM) MIMO Case

For a general n×n MIMO communication system 50 the equalized vector is given by $$\hat{x}_n = \frac{1}{\text{diag}(P_n R_n^{-1} R_n^{-*} P_n^T)} P_n R_n^{-1} Q_n^* y$$

where $H_{est,n} = Q_n R_n$.

Methods are known in the art for recursively solving the $Q_n^* y$ term of the above equation. Recursive computation of the $P_n R_n^{-1}$ and $\underline{w}_{ll,n} = 1./\text{diag}(P_n R_n^{-1} R_n^{-*} P_n^T)$ terms of the above equation will now be described.

4×4 SM MIMO Case—Substream Signal-to Noise Ratio (SNR) Recursion

Let $\underline{w}_{ll,n} = 1./\text{diag}(P_{n\times n} R_{n\times n}^{-1} R_{n\times n}^{-*} P_{n\times n}^T)$. It can be seen that for $1 \leq j < n$ the $j^{th}$ element of the $w_{ll}$ vector for n streams can be recursively computed as follows:

$$\frac{1}{w_{ll,n}^j} = \frac{1}{w_{ll,n-1}^j} + k_j$$

where $$k_j = (P_{n\times n} \underline{v} \underline{v}^* P_{n\times n}^T)_{jj},$$

$$R_{n\times n}^{-1} = \begin{bmatrix} R_{n-1 \times n-1}^{-1} & \underline{v} \\ \underline{0} & \end{bmatrix}.$$

For j=n, $$w_{ll,n}^n = \frac{1}{\lambda_n + k_n}$$

where $\lambda_n = P(n, 1:n-1) R_{n-1}^{-1} R_{n-1}^{-*} P(n, 1:n-1)^T$.

A proof of the immediately preceding equations will now be provided.

$$R_{n \times n}^{-1} = \begin{bmatrix} R_{n-1 \times n-1}^{-1} & \underline{v} \\ \underline{0} & \end{bmatrix}$$

$$\begin{aligned} \operatorname{diag}(P_{n \times n} R_{n \times n}^{-1} R_{n \times n}^{-*} P_{n \times n}^{T}) &= \operatorname{diag}\left(P_n \begin{bmatrix} R_{n-1}^{-1} & \underline{v} \\ \underline{0} & \end{bmatrix} \begin{bmatrix} R_{n-1}^{-1} & \underline{v} \\ \underline{0} & \end{bmatrix}^{*} P_n^{T}\right) \\ &= \operatorname{diag}\left(P_n \left(\begin{bmatrix} R_{n-1}^{-1} R_{n-1}^{-*} & \underline{0} \\ \underline{0} & \end{bmatrix} + \underline{v}\underline{v}^{*}\right) P_n^{T}\right) \\ &= \operatorname{diag}\begin{pmatrix} P_{n-1} R_{n-1}^{-1} R_{n-1}^{-*} P_{n-1}^{T}, \\ P_{(n,1:\ n-1)} R_{n-1}^{-1} R_{n-1}^{-*} P_{(n,1:\ n-1)}^{T} \end{pmatrix} + \\ &\quad \operatorname{diag}(P_n \underline{v}\underline{v}^{*} P_n^{T}) \end{aligned}$$

4×4 SM MIMO Case—Processing the $2^{nd}$ LTF 104

Compute $R_{2 \times 2}$.
Compute $$R_{2 \times 2}^{-1} = \begin{bmatrix} 1/ & -r_{12}/r_{11}r_{22} \\ 0 & 1/r_{22} \end{bmatrix}.$$

Compute $1/w_{II,1} = (r_{22}^2 + \|r_{11} + r_{12}\|^2)/r_{11}^2 r_{22}^2$.
Compute $1/w_{II,2} = (r_{22}^2 + \|r_{11} - r_{12}\|^2)/r_{11}^2 r_{22}^2$.
Let $\lambda = 1/w_{II,2}$.

4×4 SM MIMO Case—Processing the $3^{rd}$ LTF 104

Update the inverse of the triangular matrix based on $$R_{3 \times 3} = \begin{bmatrix} R_{2 \times 2} & [r_{13}\ r_{23}\ r_{33}]^T \\ \underline{0} & \end{bmatrix}$$

$$R_{3 \times 3}^{-1} = \begin{bmatrix} R_{2 \times 2}^{-1} & [\rho_1\ \rho_2\ \rho_3]^T \\ \underline{0} & \end{bmatrix}$$

where $\rho_1 = (r_{12}r_{23} - r_{13}r_{22})/r_{11}r_{22}r_{33}$ $\rho_2 = -r_{23}/r_{22}r_{33}$ $\rho_3 = 1/r_{33}$.

Update the substream SNRs based on $1/w_{II,1} \rightarrow 1/w_{II,1} + \|\rho_1 - \rho_2 + \rho_3\|^2$ $1/w_{II,2} \rightarrow 1/w_{II,2} + \|\rho_1 - \rho_2 + \rho_3\|^2$ $1/w_{II,3} \rightarrow \lambda + \|\rho_1 - \rho_2 + \rho_3\|^2$.

Update the lamda factor based on $\lambda = 1/w_{II,1} + 1/w_{II,1} - 1/w_{II,3} + 8\operatorname{real}(\rho_2)\rho_3$.

4×4 SM MIMO Case—Processing the $4^{th}$ LTF 104

Update the inverse of the triangular matrix based on $$R_{4 \times 4} = \begin{bmatrix} R_{3 \times 3} & [r_{14}\ r_{24}\ r_{34}\ 4_{44}]^T \\ \underline{0} & \end{bmatrix}$$

$$R_{4 \times 4} = \begin{bmatrix} R_{3 \times 3} & [r_{14}\ r_{24}\ r_{34}\ 4_{44}]^T \\ \underline{0} & \end{bmatrix}$$

where $\rho_1 = (r_{33}(r_{12}r_{24} - r_{14}r_{22}) - (r_{12}r_{23} - r_{13}r_{22})r_{34})/r_{11}r_{22}r_{33}r_{44}$, $\rho_2 = (r_{34}r_{23} - r_{24}r_{33})/r_{22}r_{33}r_{44}, \rho_3 = -r_{33}/r_{33}r_{44}, \rho_4 = 1/r_{44}$.

Update the substream SNR based on $1/w_{II,2} \rightarrow 1/w_{II,2} + \|\rho_1 + \rho_2 - \rho_3 + \rho_4\|^2$ $1/w_{II,3} \rightarrow 1/w_{II,3} + \|\rho_1 + \rho_2 - \rho_3 + \rho_4\|^2$ $1/w_{II,4} \rightarrow \lambda + \|\rho_1 + \rho_2 - \rho_3 + \rho_4\|^2$ $1/w_{II,4} \rightarrow \lambda + \|\rho_1 + \rho_2 - \rho_3 + \rho_4\|^2$.

Compute their inverses and store them in a memory that can be included in channel estimator module 72.

3×3 SM MIMO Case—Processing the $4^{th}$ LTF 104

The 3×3 MIMO case employs a non-square matrix P. For 3 streams transmitter module 56 sends 4 LTFs 104 and employs matrix P of $$P_3 = \begin{bmatrix} 1 & -1 & 1 & 1 \\ 1 & 1 & -1 & 1 \\ 1 & 1 & 1 & -1 \end{bmatrix}.$$

Channel estimator module 72 estimates channel matrix $H_{est3 \times 4}$ and the real matrix is $H = H_{est3 \times 4} P_{3 \times 4}^{\perp}$. The received vector can be based on $y = H_{est3 \times 4} P_{3 \times 4}^{\perp} x = Hx$.

A distributed solution may also be employed by working directly with $H_{est3 \times 4}$ without forming H. In the distributed solution let $H_{est3 \times 4} = QR_{3 \times 4}$ and $H_{est3 \times 4} = [H_{est3 \times 3}\ h_4]$.

Then $Q^* H_{est3 \times 4} = [RQ^* h_4]$ where $QR = H_{est3 \times 3}$.

In some embodiments the equalized vector can be based on $\hat{x} = (H_{est3 \times 4} P_{3 \times 4}^{\perp})^{\perp} y$.

It can be seen that $\hat{x} = P_1^{-1} \underline{z} - \mu \underline{v}$ where $\underline{u} = R^{-1} Q^* h_4$, and $\mu = [1\ -1\ 1]\underline{z}$.

The vector v is based on $\underline{v} = k P_1^{-1} \underline{u}$ where $\underline{u} = R^{-1} Q^* h_4$.

The scalar k is based on $k = 1/(1 + [1\ -1\ 1]\underline{u})$.

The matrix $P_1^{-1}$ is based on $$P_1^{-1} = 2 \begin{bmatrix} 1 & -1 & 0 \\ 1 & 0 & -1 \\ 0 & 1 & 1 \end{bmatrix}.$$

A proof of the immediately preceding equations will now be provided.

A solution is given by $\hat{x} = (H_{est,3\times4} P_{3\times4}^\perp)^{-1} y$.

Let $P_{3\times4}^\perp = \begin{bmatrix} P_1 \\ p_1 \end{bmatrix}$ and write the matrix as $$(H_{est,3\times4} P_{3\times4}^\perp)^{-1} = [H_{est,3\times3} P_1 + h_4 p_1]^{-1}$$
$$= [QRP_1 + h_4 p_1]^{-1}$$
$$= P_1^{-1} R^{-1} Q^* - \frac{P_1^{-1} R^{-1} Q^* h_4 p_1 P_1^{-1} R^{-1} Q^*}{1 + p_1 P_1^{-1} R^{-1} Q^* h_4}$$
$$= \left[ I - \frac{v p_1}{1 + p_1 v} \right] P_1^{-1} R^{-1} Q^*$$

where $v = P_1^{-1} R^{-1} Q^* h_4$.

$$P_1^{-1} = 2 \begin{bmatrix} 1 & -1 & 0 \\ 1 & 0 & -1 \\ 0 & 1 & 1 \end{bmatrix},$$

$$p_1 P_1^{-1} = [\,1 \quad -1 \quad -1\,].$$

3×3 SM MIMO Case—Solution for $W_{II}$

Channel estimator module 72 computes $$W_{II} = 1 / ((H_{est,3\times4} P_{3\times4}^\perp)^* (H_{est,3\times4} P_{3\times4}^\perp))^{-1}$$

based on terms of $v = k P_1^{-1} R^{-1} Q^* h_4$ and $R^{-1} R^{-*}$. Let this matrix be $$R^{-1} R^{-*} = \begin{bmatrix} I_{11} + jQ_{11} & I_{21} - jQ_{21} & I_{31} - jQ_{31} \\ I_{21} + jQ_{21} & I_{22} + jQ_{22} & I_{32} - jQ_{32} \\ I_{31} + jQ_{31} & I_{32} + jQ_{32} & I_{33} + jQ_{33} \end{bmatrix}$$

and during LTFs 104 compute $S_1 = 4(I_{11} - 2I_{21} + I_{22})$ $S_2 = 4(I_{11} - 2I_{31} + I_{33})$ $S_3 = 4(I_{22} + 2I_{32} + I_{33})$ $S = (I_{11} + I_{22} + I_{33}) - 2(I_{21} + I_{31} - I_{32})$ $S_4 = I_{11} - 2I_{21} + I_{22} - I_{31} + I_{32} + j(Q_{11} + Q_{22} + Q_{31} - Q_{32})$ $S_5 = I_{11} I_{21} + I_{32} - 2I_{31} + I_{33} + j(Q_{11} + Q_{21} + Q_{32} - Q_{33})$ $S_6 = I_{21} - I_{22} + I_{31} - 2I_{32} + I_{33} + j(Q_{21} + Q_{22} + Q_{31} - Q_{33})$ It can be seen that $W_{II1} = 1/(S_1 + S \|v_1\|^2 - 4\,\text{real}(S_4 v^*_1))$ $W_{II2} = 1/(S_2 + S \|v_2\|^2 - 4\,\text{real}(S_5 v^*_2))$ $W_{II3} = 1/(S_3 + S \|v_3\|^2 - 4\,\text{real}(S_6 v^*_3))$ and $\underline{v} = k P_1^{-1} \underline{u}$.

Proof of the above solution for $W_{II}$ will now be provided. Let $H = [QRh_4] P_{3\times4}^\perp \Rightarrow Q^* H = [RQ^* h_4] P_{3\times4}^\perp = R(P_1 + \underline{u} p_1), \underline{u} = R^{-1} Q^* h_4$ Then $$(H^* H)^{-1} = (P_1 + \underline{u} p_1)^{-1} R^{-1} R^{-*} (P_1^T + p_1^T \underline{u}^*)^{-1} =$$
$$\left( I - \frac{P_1^{-1} \underline{u} p_1}{1 + [\,1 \;\; -1 \;\; -1\,] \underline{u}} \right) P_1^{-1} R^{-1} R^{-*} P_1^{-T} \left( I - \frac{p_1^T \underline{u}^* P_1^{-T}}{1 + [\,1 \;\; -1 \;\; -1\,] \underline{u}} \right) =$$
$$(P_1^{-1} - \underline{v}[\,1 \;\; -1 \;\; -1\,]) R^{-1} R^{-*} (P_1^{-T} - [\,1 \;\; -1 \;\; -1\,]^T \underline{v}^*) =$$
$$P_1^{-1} R^{-1} R^{-*} P_1^{-T} + \underline{v}[\,1 \;\; -1 \;\; -1\,] R^{-1} R^{-*} [\,1 \;\; -1 \;\; -1\,]^T \underline{v}^* -$$
$$2\,\text{real}(P_1^{-1} R^{-1} R^{-*} [\,1 \;\; -1 \;\; -1\,] \underline{v}^*)$$

$\underline{v} = k P_1^{-1} R^{-1} Q^* h_4$.

Channel estimator module 72 still needs to recursively update $R^{-1} R^{-*}$ after determining $\underline{v} = k P_1^{-1} \underline{u}$ as described above. At a time n let $R_n^{-1} = [R_{n-1}^{-1} \rho]$ and apply the following identity $R_n^{-1} R_n^{-*} = R_{n-1}^{-1} R_{n-1}^{-*} + \rho \rho^*$.

For example, $$R_{3\times3}^{-1} = \begin{bmatrix} R_{2\times2}^{-1} & [\rho_1 \;\; \rho_2 \;\; \rho_3]^T \\ \underline{0} & \end{bmatrix}$$

$\rho_1 = (r_{12} r_{23} - r_{13} r_{22}) / r_{11} r_{22} r_{33}$ $\rho_2 = -r_{23} / r_{22} r_{33}$ $\rho_3 = 1 / r_{33}$.

3×3 SM MIMO Case—Processing the 1st LTF 104

Channel estimator module 72 performs first column nulling by computing $R_1^{-1} = 1/r_{11}$.

3×3 SM MIMO Case—Processing the 2nd LTF 104

Channel estimator module 72 performs second column QR processing based on $$R_{2\times2}^{-1} = \begin{bmatrix} R_1^{-1} & [\rho_1 \;\; \rho_2]^T \\ \underline{0} & \end{bmatrix}$$

where $\rho_1 = -r_{12}/r_{11} r_{22}$, and $\rho_2 = 1/r_{22}$.

Channel estimator module 72 then computes $\|\rho_1\|^2, \|\rho_2\|^2, \rho_1, \rho_2^*$ and updates $R^{-1} R^{-*}$ based on $$R_{2\times2}^{-1} R_{2\times2}^{-*} = \begin{bmatrix} 1/r_{11} + \|\rho_1\|^2 & \rho_1 \rho_2^* \\ \rho_1^* \rho_2 & \|\rho_2\|^2 \end{bmatrix}.$$

3×3 SM MIMO Case—Processing the $3^{rd}$ LTF 104

Channel estimator module 72 performs third column QR processing by recursively updating $$R_{3\times3}^{-1} = \begin{bmatrix} R_{2\times2}^{-1} & [\rho_1 \; \rho_2 \; \rho_3]^T \\ \underline{0} & \end{bmatrix}$$

where $\rho_1=(r_{12}r_{23}-r_{13}r_{22})/r_{11}r_{22}r_{33}$ $\rho_2=-r_{23}/r_{22}r_{33}$ $\rho_3=1/r_{33}$. Channel estimator module 72 can then compute $$\|\rho_1\|^2, \|\rho_2\|^2, \|\rho_2\|^2, \rho_1\rho^*_2, \rho_1\rho^*_3, \rho_2\rho^*_3$$

and update $R^{-1}R^{-*}$ based on $$R_{3\times3}^{-1}R_{3\times3}^{-*} = R_{2\times2}^{-1}R_{2\times2}^{-*} + \rho\rho^*$$

Channel estimator module 72 can then compute the sums $$S_1 = 4(I_{11} - 2I_{21}I_{22})$$

$$S_2 = 4(I_{11} - 2I_{31} + I_{33})$$

$$S_3 = 4(I_{22} + 2I_{32} + I_{33})$$

$$S = (I_{11} + I_{22} + I_{33}) - 2(I_{21} + I_{31} - I_{32})$$

$$S_4 = I_{11} - 2I_{21} + I_{22} - I_{31} + I_{32} + j(Q_{11} + Q^{22} + Q_{31} - Q_{32})$$

$$S_5 = I_{11} - I_{21} + I_{32} - 2I_{31} + I_{33} + j(Q_{11} + Q^{21} + Q_{32} - Q_{33})$$

$$S_6 = I_{21} - I_{22} + I_{31} - 2I_{32} + I_{33} + j(Q_{21} + Q^{22} + Q_{31} - Q_{33})$$

3×3 SM MIMO Case—Processing the $4^{th}$ LTF 104

Channel estimator module 72 computes $$\underline{u} = R^{-1}Q^*h_4,$$

$$k = 1/(1 + [1 \; -1 \; 1]\underline{u}), \text{ and}$$

$$\underline{v} = kP_1^{-1}\underline{u}.$$

Channel estimator module can store $\underline{v}$ in memory 75.

Channel estimator module 72 computes substream SNR based on $$W_{\mathit{II}1} = 1/(S_1 + S\|v_1\|^2 - 4\text{real}(S_4v^*_1))$$

$$W_{\mathit{II}2} = 1/(S_2 + S\|v_2\|^2 - 4\text{real}(S_5v^*_2))$$

$$W_{\mathit{II}3} = 1/(S_3 + S\|v_3\|^2 - 4\text{real}(S_6v^*_3))$$

and store the substream SNR in memory 75.

3×3 SM MIMO Case—Processing Data 92

Channel estimator module 72 can compute $$\underline{z} = R^{-1}Q^*\underline{y} \text{ and } \mu = [1 \; -1 \; 1]\underline{z}$$

and read $\underline{v}$ from memory 75. Channel estimator module 72 can then compute $$\underline{\hat{x}} = P_1^{-1}\underline{z} - \mu\underline{v}$$

and read the substream SNR from memory 75. Equalizer module 76 can scale the equalized vector based on the SNRs.

Figure 6A:
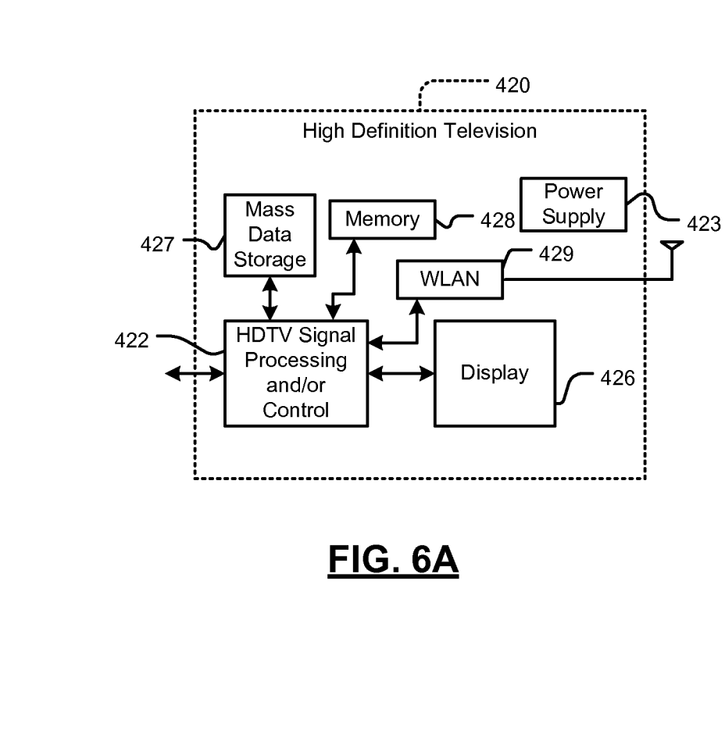
FIG. 6A is a functional block diagram of a high definition television.

Referring now to FIGS. 6A-6E, various exemplary implementations of the receiver module are shown. Referring now to FIG. 6A, the receiver module can be implemented in a high definition television (HDTV) 420. The receiver module may implement and/or be implemented in a WLAN interface 429. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. Mass data storage 427 may include at least one hard disk drive (HDD) and/or at least one digital versatile disk (DVD) drive. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via WLAN network interface 429. The HDTV 420 also includes a power supply 423.

Figure 6B:
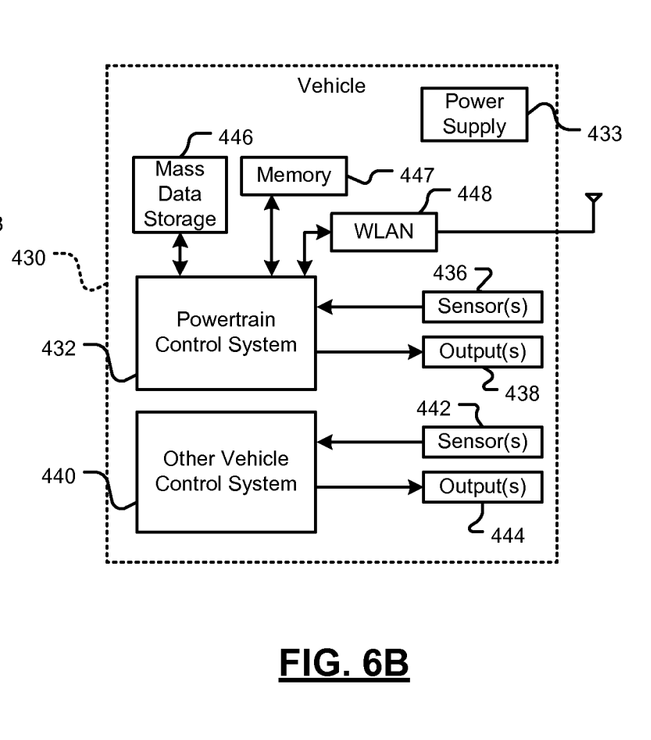
FIG. 6B is a functional block diagram of a vehicle control system.

Referring now to FIG. 6B, the receiver module may implement and/or be implemented in a WLAN interface 448 of a vehicle 430. In some implementations WLAN interface 448 communicates with a powertrain control system 432 that receives inputs from one or more sensors. Examples of sensors includes temperature sensors, pressure sensors, rotational sensors, airflow sensors and/or any other suitable sensors and/or that generates one or more output control signals such as engine operating parameters, transmission operating parameters, and/or other control signals.

The receiver module may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. Mass data storage 446 may include at least one HDD and/or at least one DVD drive. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown). Vehicle 430 may also include a power supply 433.

Figure 6C:
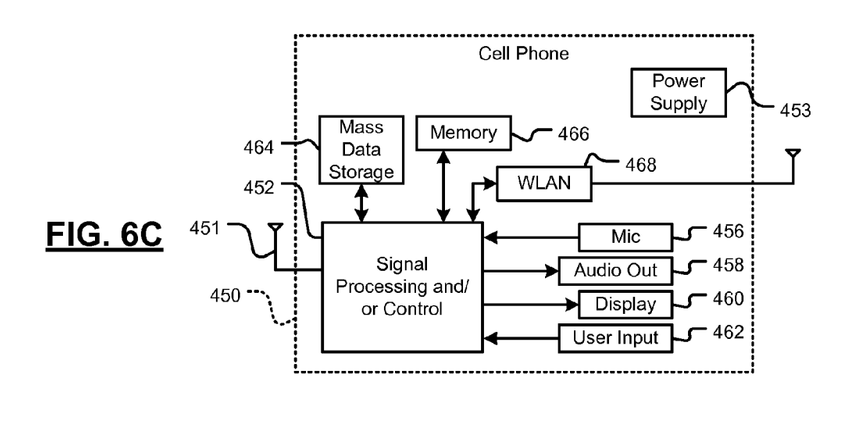
FIG. 6C is a functional block diagram of a cellular phone.

Referring now to FIG. 6C, the receiver module can be implemented in a cellular phone 450 that may include a cellular antenna 451. The receiver module may implement and/or be implemented in a WLAN interface 468. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner. Mass data storage 450 may include at least one HDD and/or at least one DVD drive. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via the WLAN network interface 468. The cellular phone 450 may also include a power supply 453.

Figure 6D:
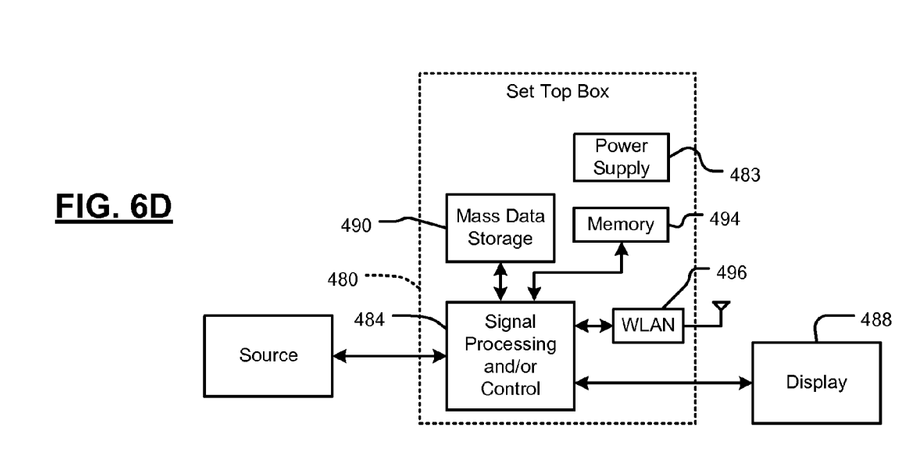
FIG. 6D is a functional block diagram of a set top box.

Referring now to FIG. 6D, the receiver module can be implemented in a set top box 480. The receiver module may implement and/or be implemented in a WLAN interface 496. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. Mass data storage 490 may include at least one HDD and/or at least one DVD drive. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via the WLAN network interface 496. The set top box 480 may include a power supply 483.

Figure 6E:
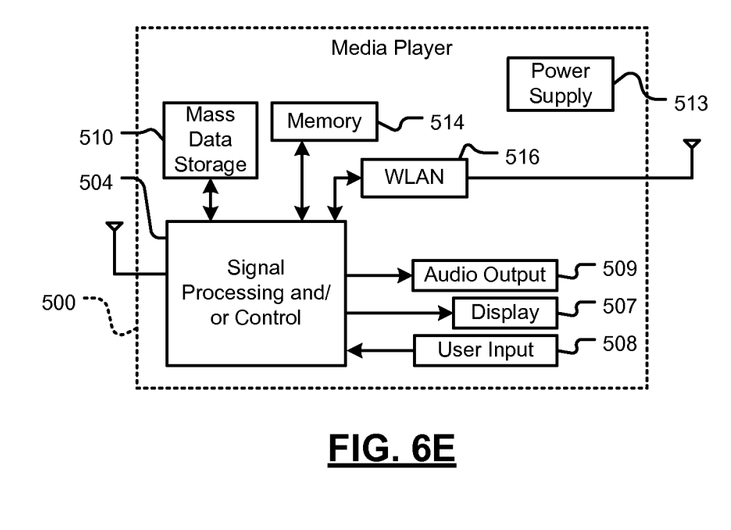
FIG. 6E is a functional block diagram of a media player.

Referring now to FIG. 6E, the receiver module can be implemented in a media player 500. The receiver module may implement and/or be implemented in a WLAN interface 516. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. Mass data storage 510 may include at least one HDD and/or at least one DVD drive. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via the WLAN network interface 516. The media player 500 may also include a power supply 513. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A wireless receiver comprising:
   an input module configured to receive a message over a wireless communication channel, wherein the message includes (i) a plurality of training fields and (ii) first data, and wherein the first data includes user data perturbed by the wireless communication channel;
   a channel module configured to
      generate a first matrix indicative of an estimation of properties of the wireless communication channel, and
      as each of the plurality of training fields of the message is being received, recursively compute parameters for equalization based on (i) the plurality of training fields, (ii) the first matrix, and (iii) a vector indicative of a substream signal-to-noise ratio;
   an equalizer module configured to
      generate equalizer coefficients based on the parameters for equalization, and
      apply the equalizer coefficients to the first data of the message to generate compensated first data; and
   a decoder module configured to decode the compensated first data to recover the user data.

2. A wireless transceiver comprising:
   the wireless receiver of claim 1; and
   a wireless transmitter.

3. The wireless transceiver of claim 2, further comprising:
   at least one antenna; and
   an antenna switch module configured to
      connect the at least one antenna to the wireless receiver while the wireless transceiver is receiving, and
      connect the at least one antenna to the wireless transmitter while the wireless transceiver is transmitting.

4. A multiple-input multiple-output (MIMO) transceiver comprising:
   the wireless transceiver of claim 2; and
   a plurality of antennas.

5. The wireless receiver of claim 1, wherein the decoder module comprises a Viterbi decoder.

6. The wireless receiver of claim 1, wherein the channel module is configured to:
   determine a second matrix and a third matrix by performing a matrix decomposition of the first matrix; and
   recursively compute the parameters for equalization based on the second matrix and the third matrix.

7. The wireless receiver of claim 6, wherein:
   the plurality of training fields have been previously encoded, prior to being transmitted over the wireless communication channel, based on a fourth matrix responsible for steering the plurality of training fields; and
   the equalizer module is configured to
      apply the second matrix to a vector of the message to generate a first intermediate result,
      apply the third matrix to the first intermediate result to generate a second intermediate result,
      apply the fourth matrix to the second intermediate result to generate a third intermediate result, and apply the vector to the third intermediate result to generate the compensated first data.

8. The wireless receiver of claim 6, wherein:
the plurality of training fields have been previously encoded, prior to being transmitted over the wireless communication channel, based on a fourth matrix responsible for steering the plurality of training fields; and
the channel module is configured to recursively compute the parameters for equalization further based on the fourth matrix.

9. The wireless receiver of claim 6, wherein the matrix decomposition of the first matrix comprises an orthogonal/upper-triangular (QR) decomposition.

10. The wireless receiver of claim 9, wherein the second matrix is based on a conjugate transpose of an orthogonal matrix of the QR decomposition, and wherein the third matrix is based on an inverse of an upper triangular matrix of the QR decomposition.

11. The wireless receiver of claim 1, wherein the channel module is configured to perform one iteration of the recursive computation of the parameters for equalization as each training field of the plurality of training fields is received.

12. A method of operating a system including a wireless receiver, the method comprising:
receiving a message over a wireless communication channel, wherein the message includes (i) a plurality of training fields and (ii) first data, and wherein the first data includes user data perturbed by the wireless communication channel;
generating a first matrix indicative of an estimation of properties of the wireless communication channel;
as each of the plurality of training fields of the message is being received, recursively computing parameters for equalization based on (i) the plurality of training fields, (ii) the first matrix, and (iii) a vector indicative of a substream signal-to-noise ratio;
generating equalizer coefficients based on the parameters for equalization;
applying the equalizer coefficients to the first data of the message to generate compensated first data; and
decoding the compensated first data to recover the user data.

13. The method of claim 12, wherein:
the system also includes a wireless transmitter and at least one antenna;
the method includes connecting the at least one antenna to the wireless receiver while the wireless receiver is receiving; and
the method includes connecting the at least one antenna to the wireless transmitter while the wireless transmitter is transmitting.

14. The method of claim 12, wherein the wireless receiver is a multiple-input multiple-output (MIMO) wireless receiver.

15. The method of claim 12, wherein the decoding comprises Viterbi decoding.

16. The method of claim 12, further comprising:
determining a second matrix and a third matrix by performing a matrix decomposition of the first matrix; and
recursively computing the parameters for equalization based on the second matrix and the third matrix.

17. The method of claim 16, wherein:
the plurality of training fields have been previously encoded, prior to being transmitted over the wireless communication channel, based on a fourth matrix responsible for steering the plurality of training fields; and
the method further includes
applying the second matrix to a vector of the message to generate a first intermediate result,
applying the third matrix to the first intermediate result to generate a second intermediate result,
applying the fourth matrix to the second intermediate result to generate a third intermediate result, and
applying the vector to the third intermediate result to generate the compensated first data.

18. The method of claim 16, wherein:
the plurality of training fields have been previously encoded, prior to being transmitted over the wireless communication channel, based on a fourth matrix responsible for steering the plurality of training fields; and
the method further includes recursively computing the parameters for equalization further based on the fourth matrix.

19. The method of claim 16, wherein the matrix decomposition of the first matrix comprises an orthogonal/upper-triangular (QR) decomposition.

20. The method of claim 19, wherein the second matrix is based on a conjugate transpose of an orthogonal matrix of the QR decomposition, and wherein the third matrix is based on an inverse of an upper triangular matrix of the QR decomposition.

21. The method of claim 12, wherein the recursively computing the parameters for equalization includes performing one iteration of the recursive computation as each training field of the plurality of training fields is received.

\* \* \* \* \*